United States Patent [19]

Schultz

[11] E Patent Number: Re. 32,063

[45] Reissued Date of Patent: Jan. 14, 1986

[54] MOTORCYCLE SAFETY-RELEASE BACK REST

[76] Inventor: Gregory K. Schultz, 22386 Gratiot Rd., Merrill, Mich. 48637

[21] Appl. No.: 650,268

[22] Filed: Sep. 13, 1984

Related U.S. Patent Documents

Reissue of:

[64] Patent No.: 4,359,129
Issued: Nov. 16, 1982
Appl. No.: 83,647
Filed: Oct. 11, 1979

[51] Int. Cl.[4] ..... A62B 35/02

[52] U.S. Cl. ..... 180/268; 180/273; 297/DIG. 9

[58] Field of Search ..... 180/268, 271, 272, 273; 280/801; 297/243, 380, 465, DIG. 9; 182/3

[56] References Cited

U.S. PATENT DOCUMENTS

| | | | |
|---|---|---|---|
| 558,019 | 4/1896 | Harshaw | 280/290 |
| 604,677 | 5/1898 | Humphrey | 280/290 |
| 660,216 | 10/1900 | Humphrey | 280/290 |
| 2,833,454 | 5/1958 | McGee | 182/3 |
| 3,159,854 | 12/1964 | Covacevich | 297/380 X |
| 3,278,230 | 10/1966 | Boyce et al. | 297/465 |
| 3,524,679 | 8/1970 | Lavenne | 297/465 |
| 3,746,392 | 7/1973 | German | 297/380 |
| 3,838,748 | 10/1974 | Gray et al. | 180/273 |
| 3,940,166 | 2/1976 | Smithea | 297/468 X |
| 4,189,022 | 2/1980 | Lazich et al. | 180/268 |
| 4,235,182 | 11/1980 | Burger | 114/39 X |

*Primary Examiner*—Joseph F. Peters, Jr.
*Assistant Examiner*—Michael Mar
*Attorney, Agent, or Firm*—Learman & McCulloch

[57] ABSTRACT

Ordinarily uncovered vehicles on which the driver is at least substantially exposed and unenclosed, such as motorcycles and their likes and equivalents, are provided with a safety-release back rest rig that is comprised of and contains a vest-like garment for the driver to wear, which body-retaining garment is strapped ahead of the driver in sling-like fashion to the vehicle structure so as to provide secure and comfortable, lean-back support for the drive during running of the vehicle while at the same time being automatically disengageable from the vehicle structure when the driver dismounts and/or has at least a portion of his or her weight removed or uplifted from and/or off the seat for mounting the driver on the vehicle.

62 Claims, 15 Drawing Figures

Fig. 3
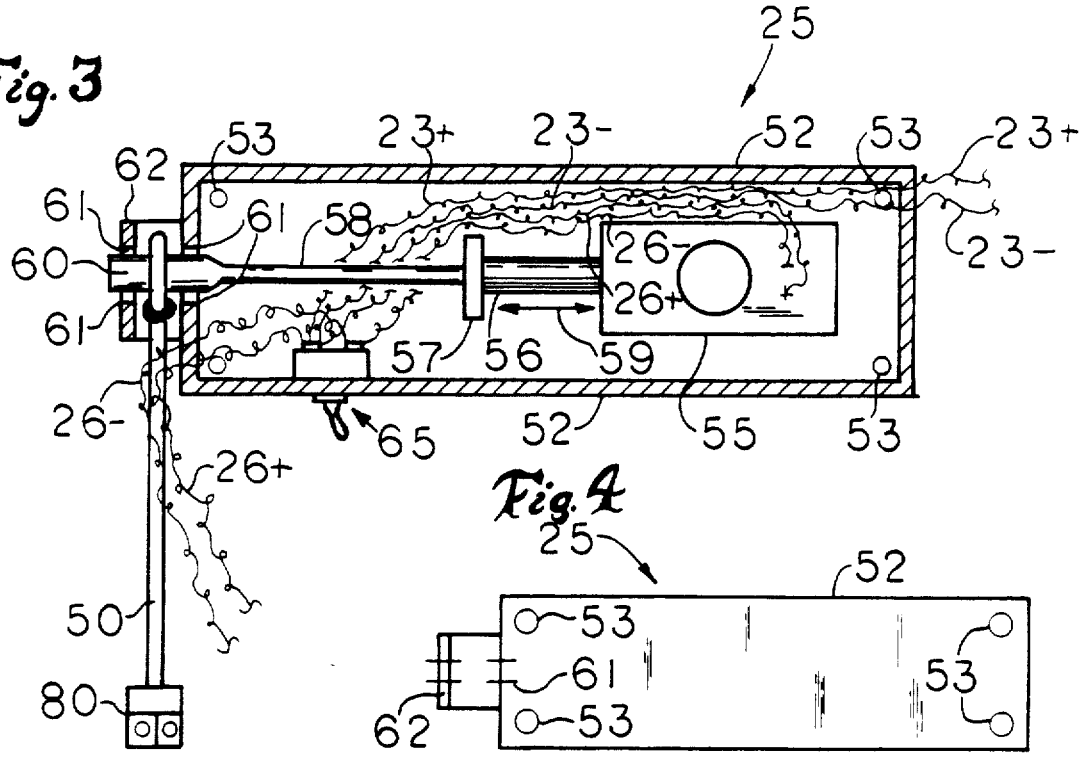
Fig. 4
Fig. 6
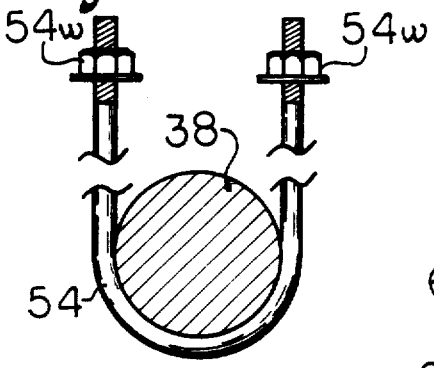
Fig. 5
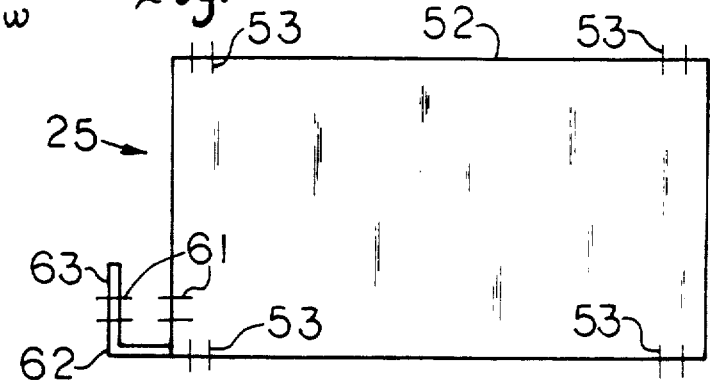
Fig. 7
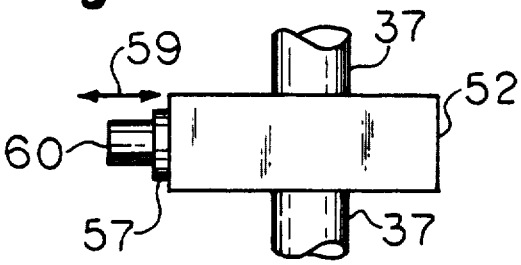
Fig. 8
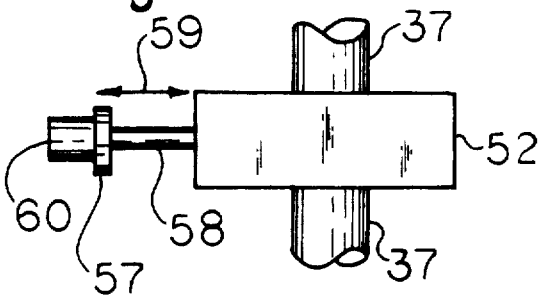

MOTORCYCLE SAFETY-RELEASE BACK REST

Matter enclosed in heavy brackets [ ] appears in the original patent but forms no part of this reissue specification; matter printed in italics indicates the additions made by reissue.

BACKGROUND OF THE INVENTION

When motorcycles and the like or equivalent unenclosed vehicles are being driven, there is unavoidably a considerable amount of vexatious, disturbing and disrupting wind pressure and turbulence action with which the driver must contend. This is oftentimes distracting and non-conductive to most careful and attentive operation of the vehicle. And, it is a condition that exists more or less independently, i.e., above and beyond particularly-encountered, naturally-occurring, ambient wind conditions. Of course, all of this is in relatively increasing or decreasing relationship (as the case may be) to the speed or forward velocity at which the vehicle is being driven as well as the general direction of existant wind (with respect to direction of vehicle travel).

Wind effects and the factors thereby generated aggrevate the typical lack of back and shoulder support problems and physical discomfort frequently, and often troublesomely, experienced by the unenclosed vehicle rider; being pronouncedly so in connection with motorcycling.

In this connection, even the inclusion and application of windshields on unenclosed vehicles does not entirely solve nor completely alleviate the problem. These are fine to thwart impact by insects, flying gravel, stones, and other particles. They are nonetheless incapable of eliminating or overcoming the mentioned wind factors and unsupported body aggrevations. The driver of a windshield-equipped motorcycle or the like still has to maintain some rather tight and strained body postures and steering control holding on operation of such conventionally-outfitted vehicles.

There have been heretofore proposed certain types of back-rest arrangements for motorcycles and the like. These, invariably, are of the constructions that offer support merely from the underside and/or from the rear of the rider.

Nonetheless, nothing in prior art appears to realistically concern itself with nor teach or lead to an effective, efficient and extremely comfortable and practical somewhat "sling-type", as it were, motorcycle or the like safety-release back rest contrivance or implementation in the manner of design and beneficial functionality and operability in the way so crucially indigenous as in the present contribution to the art.

FIELD AND PURVIEW OF THE INVENTION

The present invention, and the principal aims and objectives attainable in its practice, pertains(s) and direct(s) to a novel and, in the overall, unprecedented safety-release back rest rig or implementation in cooperative combination of the essential parts, elements and components therefor and thereof that effectuates:

(i) maximized positive and discomfort-avoiding or -preventing back and shoulder support and rider comfort for and during traveling operation of the vehicle by the driver thereof whereby the same is all afforded by a more or less sling-type holding arrangement of and for the driver; and (ii) utmost convenience and safety in speedy and sure disengagement of the support rig from firm vehicle attachment at the will and wish of the driver and/or in the event of unexpected accident or other rider-throwing influence that may arise in use of or travel with the vehicle.

The achievement and provison of all indicated, with even more and additionally other benefits and advantages derivable in and from present practice appear and become more evident in the ensuing description and specification.

SUMMARY OF THE INVENTION

The present invention, in its genesis and as derives from the discovery on which it is based, pertains to an unprecedented and highly advantageous safety-release back rest rig assembly for a motocycle having forward or stem and rearward stern terminations and like or equivalent vehicle(s) comprising, in cooperative interrelated association and combination: a basic vehicle body structure; means on said vehicle body structure for seating a driver of said vehicle in appropriately mounted driving disposition on and for said vehicle; vest-like and equivalent garment apparel means for wearing by said driver, said vest-like means being adapted to well receive and encasingly hold said driver; at least a single safety strap means attachable and securable at or about its rearwardly-extending end in sling-like, forwardly-disposable fashion to the frontal part of said vest-like means for wearing by said driver; a safety strap(s) means holding and releasing component unit secured fixedly on said body structure of the motorcycle forward of said seating means for said driver, which component upon and by electrical energization thereof is adapted to receive, anchor and lockingly-engage the forwardly-disposable portion at or near its forward end of each of said therein plugged-in safety strap(s) means when said component is in a "locking" and safety strap-retaining position and to also release and freely disconnect, disanchor and disengage said forwardly-disposable end of each of said safety strap(s) means when said component is in an "open" and safety strap-releasing position; an electrical switch and circuitry switching unit under said seating responsive for "on" and "off" setting purposes to applied driver weight when one is sitting thereupon and electrically connected with said component unit which is adapted to pass adequate electrical energy by means of interconnecting electrical circuitry so as to cause said component unit in said cooperative rig combination assembly to firmly and strongly anchor, engage and lock to close and secure any portion of said forwardly-disposable end(s) of any and all of said safety strap(s) means therein plugged when at least a predetermined portion, if not all, of the total supported weight of said driver is mounted and disposed and resting upon said seating means; and, conversely to cause said component unit to quickly, freely and easily disanchor, disengage and open to free and unsecured liberated disposition any portion of said forwardly-disposable end(s) of any and all of said safety strap(s) means therein plugged when more than said predetermined portion, if not all, of the total supported weight of said driver is dismounted and neither disposed nor resting upon said seating means.

Still other features and implementations of beneficial import and salience are advantageously combinable in and made integral part(s) of the basic, more-or-less "harness" sort of above-delineated safety-release back-rest rig assembly of the invention.

Thus, various suitable parts, elements, sub-assemblies and overall assemblies plus other equippage for utilization, as well as working details, embodimental instructions and parameters and other specifies of the invention are also set forth in the following Specification.

ILLUSTRATED EXEMPLIFICATION OF THE INVENTION

The invention is pictorially demonstrated in and by the fifteen (15) views of the accompanying Drawing (all of which, for simplicity and convenience, are illustrated in a more-or-less schematic and/or fanciful manner of representation and utilize insofar as possible the same reference numerals for like and/or similar parts and/or elements) wherein, as they are to be taken in conjunction with the Specification that follows:

FIG. 3 is a plan view, partly in section, of one embodiment of the essential releasing component to safely disengage the back-rest connection when actuated by rider weight relief on or removal of sitting pressure from the seat of a motorcycle equipped pursuant to the invention;

FIG. 4 is another plan view, in highly simiplified form, of the releasing component of FIG. 3;

FIG. 5 is a side elevation view, also in greatly simplified representation, of the releasing component of FIG. 3;

Figure 9:
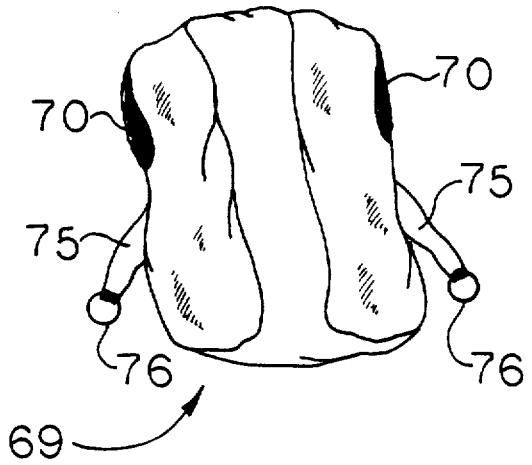
Figure 10:
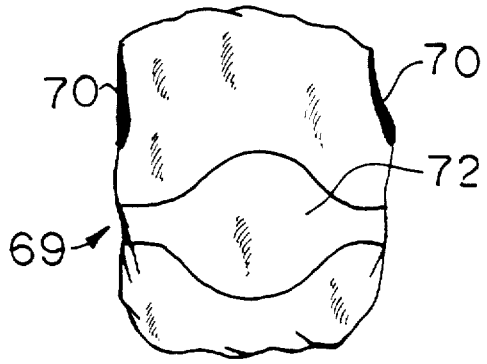
Figure 11:
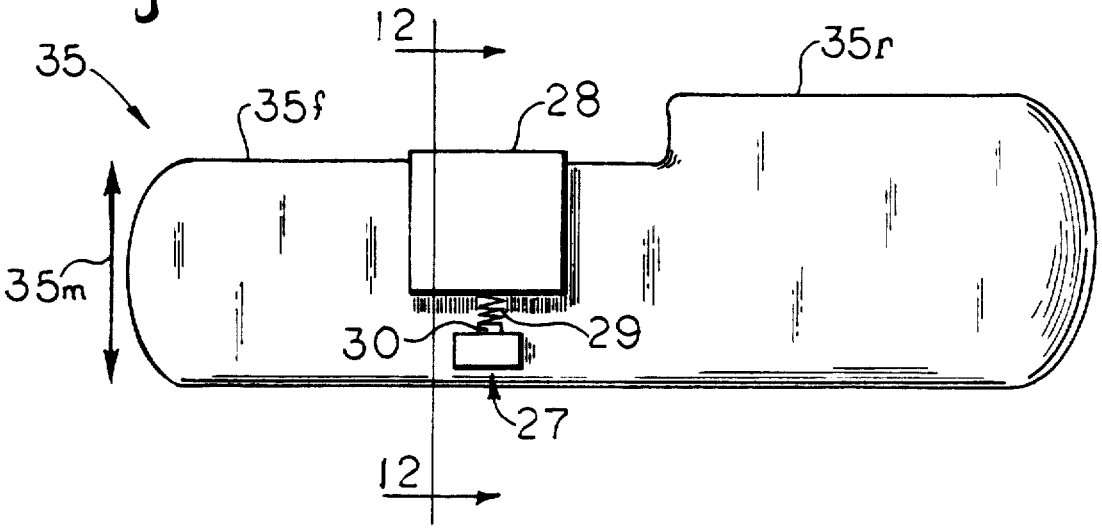
Figure 12:
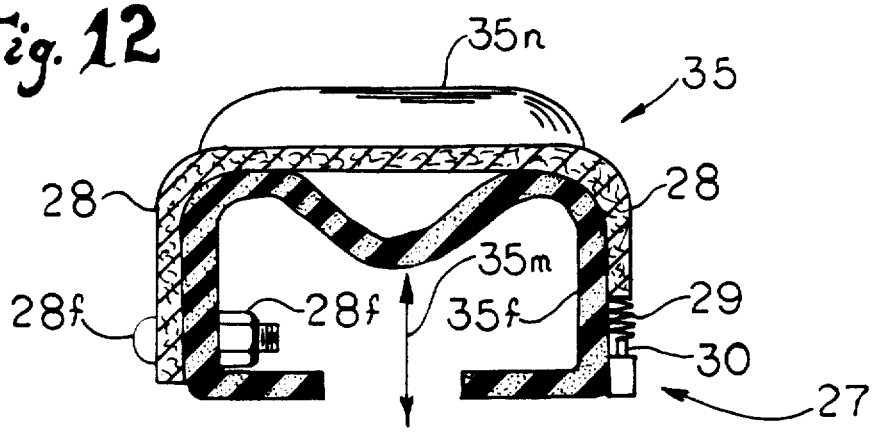
Figure 13:
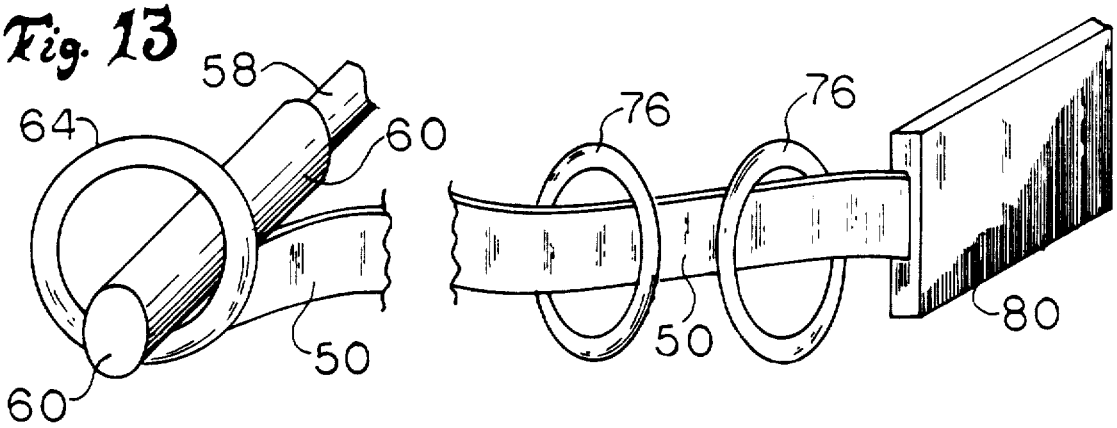
Figure 14:
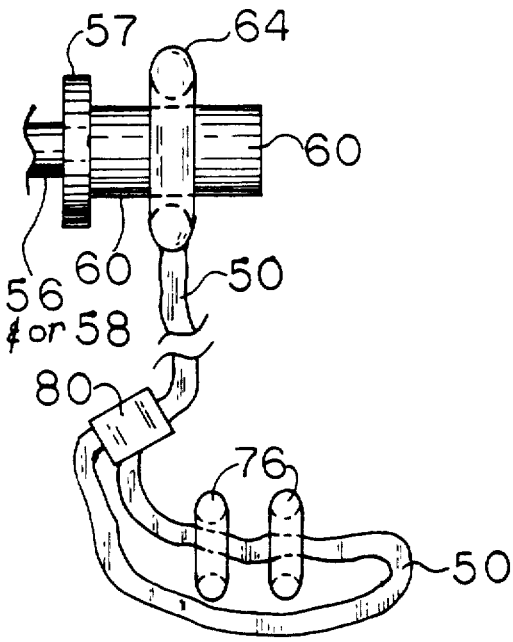
Figure 15:
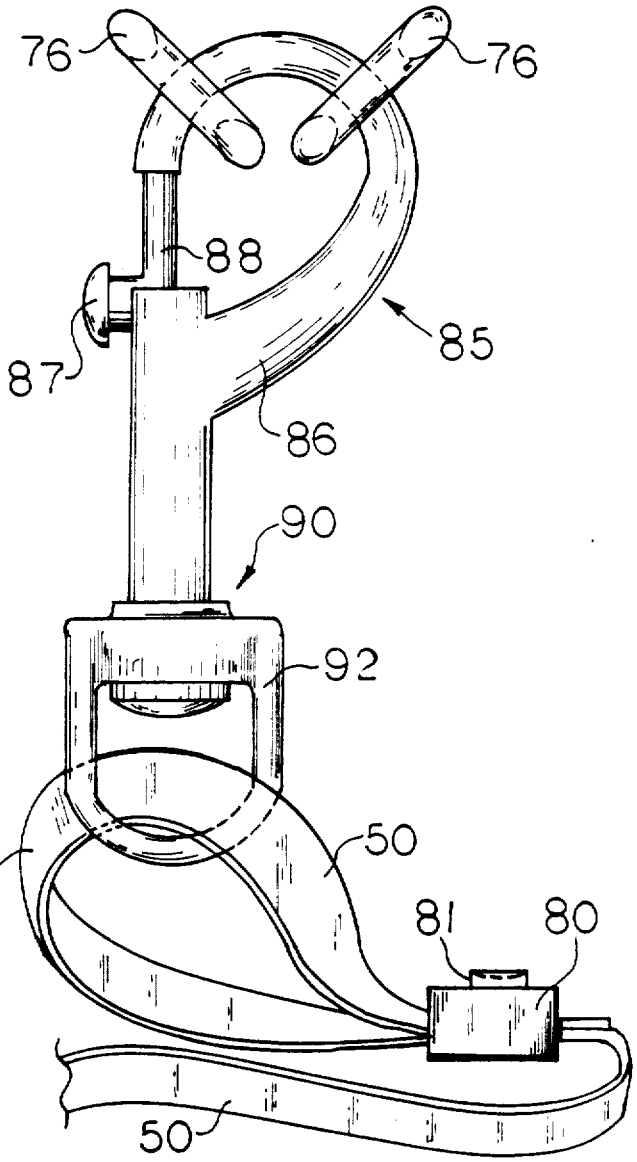
Figure 15:
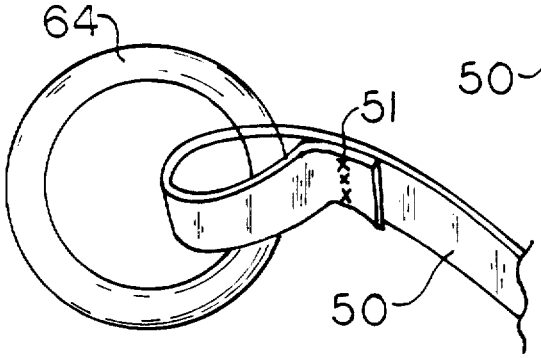

FIG. 6, in side elevation partly in section, is a view of one simple mechanical way to attach the releasing component of FIG. 3 on the handlebar of a motorcycle;

FIGS. 7 and 8, respectively, are simplified side elevation views of the releasing component of FIG. 3 demonstrating its function and also showing it in a differently-mounted position on the handlebar neck part of a motorcycle;

FIGS. 9 and 10, respectively, are schematic front and rear views of one possible embodiment of a back-rest vest or other jacket or like vestment component utilized in assemblies pursuant to the invention;

FIG. 11 is a side elevation view of a typical (and representative) seat for a motorcycle of the like or equivalent vehicle showing one embodiment of a weight-responsive assembly and switching arrangement for activating the releasing component of FIG. 3 (and other of the FIGURES herein in which it is also depicted);

FIG. 12 is a cross-sectional view of the seat of FIG. 11 taken along the Line 12—12 in FIG. 11;

FIGS. 13 and 14 are, respectively, simplified perspective and top elevation views of the overall-effective safety-release apparatus combination of the present invention illustrating possible safety strap-securing connections and attachments between the releasing component detailed in FIG. 3 and the back-rest vest or the like illustrated in FIGS. 9 and 10; and FIG. 15 is a plan view, partly in perspective, demonstrating one advanteous variety of strap connection means or linkage for utilization in practice of the invention to interconnect the releasing component of FIG. 3 with the back rest vest or the like garment shown in FIGS. 9 and 10.

Figure 1:
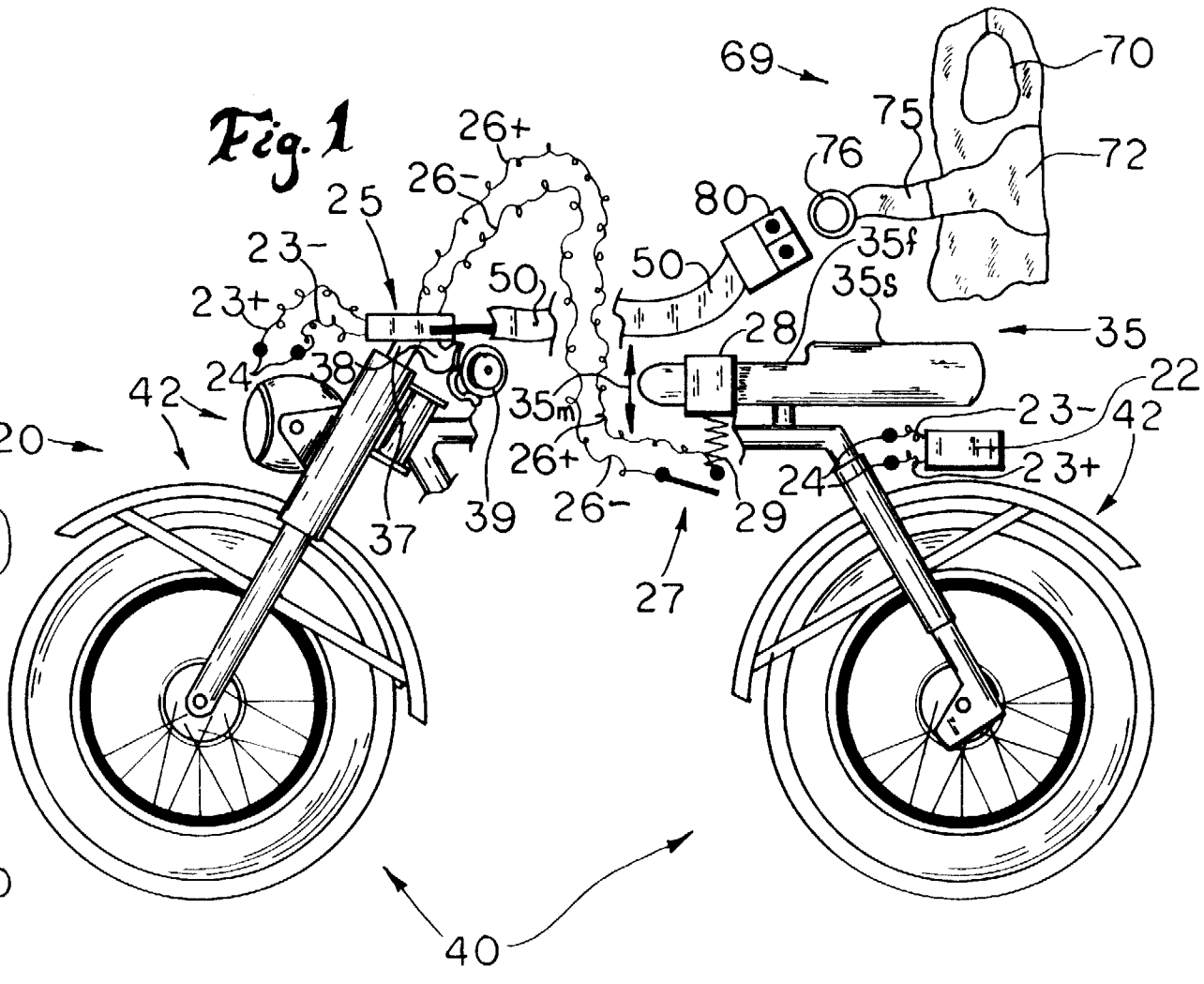
FIG. 1 is a fanciful, partly broken-away, side elevation view of the essentials of a motorcycle (also representative of a like or equivalent vehicle) to the extent necessary to be illustrated in order to show inclusion therewith and thereon of the safety-release back rest provision and development in accordance with the present invention.

For expedience and enhanced clarity of associated parts, elements, components, subassemblies and assemblies, simultaneous reference is now had to all the included FIGURES in the Drawing with explanation thereof in the following catalogued description of parts, etc., as indentified by the reference numeral(s) (i.e., "Ref. No(s).") therewith associated (and not given in strictly sequential numerical order):

| Ref. No(s). | Description With Relevant Corollary Explanation |
|---|---|
| 20 | General designation of a motorcycle or like or equivalent ordinarily unenclosed vehicle, especially of the motor-driven or otherwise powered type. Motorcycles, per se, normally have two, but sometimes more, wheels. The basic and fundamental wheel pair is attached to or depend from in spaced, aligned relationship, a frame. Upon the frame is situate a seat for the rider or cyclist (with often enough room thereon for a rearwardly mounted passenger behind the rider). The vehicle is generally steered or directed in movement by at least a single handlebar steering arrangement (usually a transverse but at least effective pair of same to be held and gripped by both hands of the cyclist). Connected to the handlebar, or an actual part of it, is a neck portion or extension. The neck leads to an associated fork to turn the (usually) front wheel for steering and movement guidance. Motorcycles (or more simply and popularly, "bikes" as they are sometimes described in the vernacular) can include 3-wheel versions. These include those wherein the third wheel provides support for a side car. For present purposes, meanings and comprehensive intents, equivalents of motorcycles include foot-pedalled bicycles, tricycles and other similar vehicles. Thus, they may be such vehicles as the so-called "Mo-Peds" and the like, which are motor assisted or driving, power supplemented through circumferential drive-connected wheel-engaging locomotion assemblies or even other auxiliary motor means for added locomotive assistance. Or, they can also be the more simple, conventional motorbikes (which, in effect and result, are much lighter and lower powered versions of motorcycles). Additional to those and intended to be construed as "motorcycles" within the meaning of vehicles adapted to be benefitted by practice of the invention are such vehicular products as the so-called "snowmobiles", certain types of power or other boats and so forth. |
| 25 | General designation of the releasing component to disengage the holding strap or the like which hooks to vest back rest and the like designated by Ref. No. 69 and below more fully described but as portrayed in FIGS. 1, 9 and 10 of the Drawing. Many varied designs and embodiments may be conceived and provided to serve as efficient, electrically-controlled releasing units or components. In all, however (and regardless of particular hookup features and connecting arrangements), the function is to "open" or unlock the component so as to free or clear the strap clasp engagable (or engaged) by catch means in the releasable component when the component is activated by changing to an "off" or other component opening setting of a pressure-sensitive or equivalent sort of actuating switch associated with the seat. The switch is normally turned "off" so as to open or "break" the re- |

-continued

Figure 2:
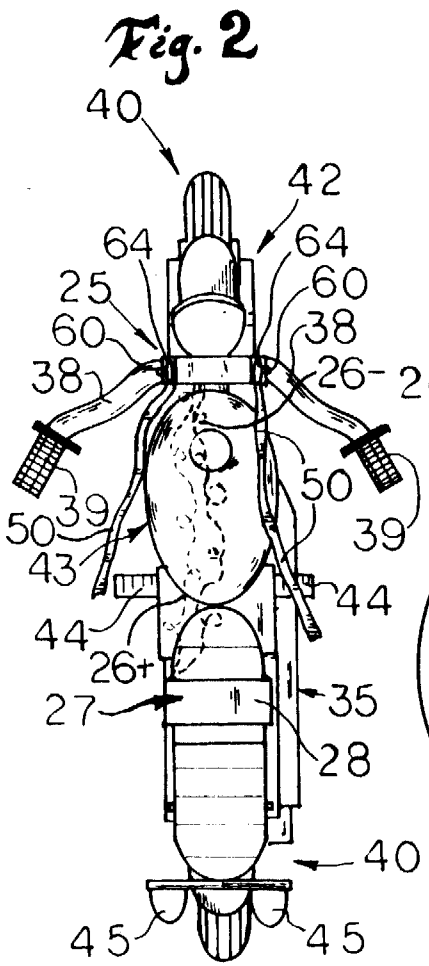
FIG. 2 is a fanciful top view of a motorcycle demonstrating in different aspect some of the features brought forth in FIG. 1 and also brings out a possible variation in the back-rest strap-connecting and supporting arrangement in assemblies in accordable with the invention.

| Ref. No(s). | Description With Relevant Corollary Explanation |
|---|---|
| | leasing component activating circuit; this being secured due to achievement of a switch "on" by means and virtue of the seat-depressing weight of rider when mounting and sitting, resting or riding, upon the seat. This then puts or keeps the releasable component in the "closed" or strap-engaging or -holding position. It (i.e., the component) goes "off" when all or any desired and pre-determinable portion of the rider's weight is relieved from the seat (say 50–100 lbs. or so depending on how any given set-up is wanted to be operative); to thus electrically activate the strap-releasing component into the "open" position. The opposite effect giving identical results can be achieved if desired; this, in other words, being to have the seat switch turned "off" by rider weight pressure so as to electrically activate the releasable components into its strap-catching "closed" or "shut" position position turned "on" to de-energize the releasing unit control system circuit putting it into the "open" and strap-releasing position when there is release or relief of rider-weight influence pressure off of or up from the seat. One convenient arrangement and constructioned form for the releasable unit is to utilize a strap-engaging pin or catch that is movable and thrown or controlled to respective "open" and "closed" position (or vice-versa) by a solenoid system which is such as to make the pin movable in one or two directions upon electrical energization; this being so electrically-connected to the seat switch as, regardless of any given circuitry and energization details, to render the releasing component in "closed" setting when the rider is on the seat but otherwise "open" when the rider is not on the seat (or not exerting or putting enough desired weight on the seat if less than full weight for switch control). As is well known, the effect of the solenoid type unit is to react or function by magnetic-field creation when electrically charged or supplied, thus forcing movement in one or another direction of a magnetically-responsive element or unit therein subject to attraction or repulsion by the magnetic unit. Preferably (for utmost durability, longevity and mechanical-breakage-resistance, solid state circuitry is employed in the electrical system of and for the releasing component (although any other suitable and workable electrical circuitry installation and component construction can be employed). An illustratively good example of a nicely workable strap-catching actuator for use in practice of the present invention is the sort of actuator used for electrically-controlled, automative power-door locks; the same being well typified by the "CEL-NOID" (Reg. TM) unidirectionally effective actuator as are found in such commercial automobiles as a model Year 1978 "OLDS 98" (Reg. TM) manufactured by the Oldsmobile Division of GENERAL MOTORS CORPORATION (i.e., "GM"). The releasing component can be and often is only singly (or individually) operable upon and functionally cooperative to clasp and release a single strap. Or, and sometimes, with advantage (and, as is schematically illustrated in FIG. 2 of the Drawing), it may be bifunctional and operative to simultaneously engage and/or release two straps set up to provide a double band (i.e., more or less "sling-shot" style sling band) arrangement for connection to the back rest vest unit. The releasing component of neck is usually securely mounted to and on top of the handlebar; although it may be fixedly attached to the handlebar neck or, for that matter, in any other position or location on the motorcycle ahead of the rider in the forward-moving direction of the vehicle so long as its positioning allows for ample strap length and is not interfering with free and unentangling (or easily-entangled relationship) disposition of the strap as it extends in connection with the releasing forward or unit and the back-rest vest unit worn by the rider. |

-continued

| Ref. No(s). | Description With Relevant Corollary Explanation |
|---|---|
| 35 | General designation of the motorcycle or the like seat with which the releasing component activating switch is, in one or another way, associated. While no so restricted, most motorcycle seats are usually (as shown in the cross-section of FIG. 12) more or less contoured and configured for rider-straddling comfort and made of relatively rigid sponge rubber, rubber, leather or other padded substance form fabrication (and so forth) and are also so constructed as to have: |
| 35f | a forward or more or less nose-section or part upon and over which the rider usually straddle mounts and actually sits during vehicle operation and with or about which portion the seat switch arrangement and provision is usually associated: and |
| 35r | a rearwardly-extending or -directed, somewhat-elevated rear portion on which a passenger may ride and/or various items of luggage and other gear, etc., may be stored and carried. |
| 35m | Bidirectional arrow symbolizing movement or other rider weight effect to actuate the assembly-controlling seat switch for governing the releasing component to the "on" and strap-engaging closed position when the weight of the rider is thereon (as indicated by the vertically-lowermost arrowhead) and/or to the "off" or strap-releasing open position when rider weight (or, if desired, some proportion less than total) is partially or fully thereoff (as indicated by the vertically-uppermost arrowhead). |
| 22 | Power source or supply, usually positioned under the seat but also possible to place at any other convenient location such as direct to a battery unit (built-in or specially provided if not customarily available with normal assembly of any given vehicle equipped in accordance with the invention). |
| 23+ and 23− | Power supply electrical wiring (normally best of conventional automobile grade and quality style or equivalent) from energizing source to releasing unit. |
| 24 | Connection terminals (optional and depicted only in FIG. 1) for inter-connecting supply wires 23+ and 23−. |
| 26+ and 26− | Actuating control wires between releasing component or unit and seat switch. |
| 27 | General identification of seat switch unit which, depending upon whether or not in "on" position according to carriage of rider on seat, per above explanations, activates the releasing unit (this switch being symbolically illustrated in FIG. 1 and figuratively depicted in FIGS. 2, 11 and 12 of the Drawing). |
| 28 | As a crucial part of one simple and effectively operable means of "turning" or setting the seat switch to "on" and "off" positions, a one-end-fixedly-fastened strap encircling the forward part 35f of the seat (or other part of other type seats or cyclist or other vehicle mountings for carrying the rider). This strap or band in most cases is necessarily to be at least essentially, if not completely, non-elastic or not-substantially-stretchable material such as leather, pliable (but without appreciable "give" on normal attempts to stretch or elongate) plastic, tough-knitted or otherwise constructed belting stock of textile of metallic strands, flexible and for practical purposes non-extensible metal and so forth. |
| 28f | Fastener connection (shown only in FIG. 12) for rigidly securing one end of the strap to a side of the seat at and from which fixed point is commenced the seat incirclement of the strap, such as the nut, washer and bolt set going through an accommodating hole (not shown), preferably reinforced, provided in the seat strap at or near its fastened end. Other fastening arrangements can also be employed, such as riveting, stitching, gluing, welding (where appropriate), etc. |
| 29 | Spiral expansion spring or equivalent expansion |

-continued

| Ref. No(s). | Description With Relevant Corollary Explanation |
|---|---|
| | yielding means to connect free end of strap to seat switch operating button, knob or other switch "turning" projection. While very useful, such spring means are not absolutely critical or necessary. In any event, the idea is to have the weight of the rider on the seat (or some portion thereof) tend to stretch the strap enough to turn the switch "on" when the seated position is taken and to turn it "off" when there is a release or taking off of such weight. While off-hand apparently contrary to the above-given description of the seat strap of band 28 but, on introspection, entirely consistent therewith, the spring means may be eliminated if the strap is inherently sufficiently (but limitedly) yieldable or elastically stretchable enough to obviate any need for separate spring means to accommodate switch action by influence of the rider's mounting or dismounting of the seat or being unexpectedly thrust upward off the seat during vehicle movement as when encountering violent road bumps or because of dislocation or being thrown off the seat in and because of some sort of mounted-position-disrupting accident or other calamity. |
| 30 | Seat switch plunger or stem (or like or equivalent switch "turning" means in or on the switch connected with and between the spring means and/or seat strap. |
| (None-And Not Shown) | Equivalent or substitute means to activate and deactivate the releasing component or unit in place of the above-described types and varieties of actuable seat switch arrangement, such as pressure sensitive electronic switching units directly placed on the surface of the seat for normal engagement when mounted by the buttocks or lower anatomical parts of the rider; photoelectrically workable switching devices and arrangements; and so forth as will be apparent and comprehensible to and by those skilled in the art. |
| 36 | General designation of the motorcycle frame. |
| 37 | Neck joint from frame to handbar (with turn-bearings and like mechanism for moving the wheel through, the neck, etc., by handlebar manipulation(s) and adjustment(s) not shown). |
| 38 | Handlebar (with throttle handle or clasp and/or other accessories not shown). |
| 39 | Handlebar grips. |
| 40 | General identification of wheel assemblies, including spokes and the like and tires (but not illustrating or detailing mountings, bearings, drive means, etc.). |
| 42 | General designation of fender and headlight, etc., assembly (FIGS. 1 and 2 only). |
| 43 | General designation of gas and other fuel tank, etc., assembly (FIGS. 1 and 2 only). |
| 44 | Foot rest pedals (FIG. 2 only). |
| 45 | Tail lamp and/or turn signal unit (FIG. 2 only). |
| 50 | Safety- and support-strap (or straps) to connect releasing component or unit 25 with and between back-rest vest 69. Usually only a single strap is employed although, as above-explained, two may be utilized. Safety-strap is usually preferably of leather but, if desired, may be of any of a number of other desired materials of construction including those described above in connection with seat strap 28. Likewise, other equivalents (also applicable to the seat strap or band) may be employed including strong rope, cordage, cable, wire (single strand or braided), etc. |
| 51 | Stitching (shown by -x-x-x-x-x-x- delineation in FIG. 15 only) to secure free end of strap to and/or through rings, catch bands or brackets or equivalent clamp or holding means to engage strap with releasing unit. Although not usually desirable for reasons of non-adjustability as below-explained, the other end of the strap fastenable to the vest 69 may also be so arranged. |
| 52 | Housing enclosure or equivalent as cover box structure for releasing component unit. |
| 53 | Clamping holes in releasing unit to allow easy and convenient handlebar-top mounting and affixing arrangement of releasing unit permitting passage therethough of suitable connectors; such as a |
| 54 | U-clamp (or equivalent fastening means) as depicted in FIG. 6); with accompanying |
| 54w | Nut and washer parts to tighten the U-clamp to strongly and securely hold in place the releasing unit. |
| 55 | The solenoid-activating (or equivalent) actuator for getting the releasing unit into "open" or clear and free or "closed" or locked or shut position with respectance for engagement of safety-strap 50 therein. This, as shown only in FIG. 3, can advantageously be one of the above-described "CEL-NOID" or like units. |
| 56 | Shaft from actuator to the actual "hold pin" which engages and locks the safety-strap. |
| 57 | Rubber or equivalent stop (not absolutely necessary) on shaft 57 or its extension 58 to serve as stop-motion device in retraction of "hold pin" into the housing enclosure 52 when the releasing unit is actuated into the "open" and safety-strap-releasing position. |
| 58 | Extension (when necessary) of shaft 56 to juncture with "hold pin" part. In this, the shaft 56 and any extension 58 of same are usually cylindrical and of smaller diameter than the "hold pin". However, they can, if desired, be the same as the "hold pin" so that the latter, in effect, is merely the terminal end part of the shaft (or extension thereof). Of course, the shaft can also be of larger size than the "hold pin", although this is normally not done excepting when, for some particular reason, a very small-sized "hold pin" is wanted. Likewise, other than cylindrically-configured shaft(s) and/or "hold pins" can be utilized. |
| 59 | Bidirectional arrow (included in FIGS. 3, 7 and 8) indicating "hold pin" back-and-forth motion to put the releasing unit into the "open" position when the pin is retracted and in the "closed" or safety-strap-locking position when the pin is outwardly extended. In the usual set-up, a shaft "throw" or movement span of 1¼" (±50% or so) is adequate. |
| 60 | The "hold pin" or catch for engaging and locking the free-end of the safety strap when the releasing unit is in "closed" or shut and locked position. The hold pin usually goes through an accommodating ring or equivalent buckle or clamp attachment at the free end of the safety strap when the latter is inserted into the releasing unit for locked engagement therein. Although such rings are hereinafter illustrated in connection with the strap 50, it is evident that they may be replaced by reinforced-apertures in the free-end of the strap and/or grommets or grommet-like fixtures built into the free end of the strap. Likewise, while the safety-strap-catching arrangement is primarily herein illustrated by the ring-traversing "hold pin" sort of assembly above explained, it is to be understood (although not illustrated in the Drawing) that this sort of combination may be replaced by equivalent sorts of locking and grasping devices and constructions for keeping the safety-strap in engagement with the releasing unit when it is intended to be therein fixedly held and locked. Thus, the free end of the safety strap may be provided with an "alligator" or toothed (or other) projection terminal attachment which fits into accommodating jaw-like retainers or indentured clamps for keeping, when so wanted, the safety strap locked in place. Likewise, it is also possible to utilize strong magnet holding means that are adapted to go "on" and "off" as the releasable unit is accordingly controlled and actuated which magnetically catch and grasp a magnetically-attractable and securable end portion of the safety-strap. |
| 61 | Support holes or openings, acting somewhat as journal bearings, in the frame housing of the |

-continued

| Ref. No(s). | Description With Relevant Corollary Explanation |
|---|---|
| | releasable unit. |
| 62 | A partially or fully enveloping bracket fixture (excepting for an unenclosed opening to admit and take out the connection for the safety strap hold pin when it is either retracted or extended). |
| 64 | The accommodating ring or the like at the free end of the safety strap which is caught and held by traverse therethrough of the "hold pin" when extended to have the releasable unit in "closed" or locking position. |
| 65 | An auxiliary (and optional) "on-off" or reversing switch to keep power out of (or in - depending on which sort of solenoid actuating circuitry and arrangement is employed) the "CEL-NOID" or like or equivalent part of the releasable unit so as to render the latter inoperable and keep it open when switch 65 is not turned "on". This is a convenient addition to or supplementation of the assembly since it permits the cyclist to turn on or shut down the releasable unit so as to keep it "open" at will, as during actual driving travel of the motorcycle (or equivalent vehicle). In this, the driver may not always want the apparatus working whenever he (or she) is sitting on the seat; there being times as can readily be understood when the safety-release back rest appliance of the present invention may be only wanted or needed to be utilized during certain intervals or portion of any involved trip or travel with the motorcycle. |
| 69 | General identification of back-rest vest or equivalent jacket, coat or other vestment or garment (or even a simpler mid-section encompassing cincture or girdle-like affair). The vest depicted in FIGS. 1, 9 and 10 of the Drawing is shown as a sleeveless garment of typical vest-like style. Those are often desirable to make of heavy denim or the like cloth or fabric. However, cold or foul weather jackets and the like gear (with full sleeves, etc.) can be used instead of the less cumbersome vest, as may coats or other types and styles of apparel. |
| 70 | Vest arm holes. |
| 71 | Reinforced stitched-on or otherwised securely-affixed support strap for back of vest (shown only in FIG. 10). While such extra construction is optional, it definitely tends to make for firmer and more sturdy support characteristics in and capabilities of the back-rest vest (or the like or equivalent garment). It is thus usually desirable to have incorporated in the vest. |
| 75 | Affixed belt or strap connection from (and usually at the sides and in furtherance of reinforcing support 71) the vest to the free ends of which suitable means such as connecting rings, loops or other fastening means are provided. When a single safety strap is employed in extension from the releasable unit, it is connected with both of the vest straps so as to terminate at about the rider's frontal mid-section. When double safety strap arrangements are utilized, each of the separate safety straps are respectively connected to each of the integrally dependent and loosely-hanging vest belt or strap connections so as to secure the rider in a more or less sling-like arrangement. |
| 76 | Connecting rings or the like engageable fixtures at the ends of the vest straps to and/or through which the safety strap(s) from the releasing component or unit is/are attached. |
| 80 | An adjustable buckle (shown in more or less detail in FIGS. 3 and 13-15 of the Drawing) to make a nicely and comfortably taught lengthening or shortening of the safety strap to adjust to particular vest or the like designs and rider's posture and desired positioning on the seat. While a given-length safety strap may be employed, the inflexibility of same does not always provide for most comfortable and optimum usage of the back-rest assembly. It may be too long for some drivers and desired posture situations and too short for others. An adjustable buckle arrangement generally overcomes any such sort of deficiency. Many suitable styles and forms of adjustable buckling means may be employed. Thus, they may be of the well-known sort frequently used in and for mountain-climbing gear and apparatus. Or they may be like conventional automobile or airplane seat buckles such as those available from GM under the Registered Trademarks "IRVIN IC 4500" and "IRVIN III" and/or the like or equivalent thereof. In any event, the adjustable buckle permits feeding a single or double safety strap through the vest connecting rings 76 then loosening or taking-up on the safety strap(s) by means of buckle manipulation to get the precise effective safety strap length needed or wanted. |
| 81 | A release or engagement "button" for an adjustable buckle (drawn in only in FIG. 15). |
| 85 | General designation (illustrated in FIG. 15 only) of a swivel (or other) type snap clamp or readily-openable hook or clasp for very conveniently attaching the disconnected end of the safety strap(s) from the releasable unit to the connecting rings or the like on the vest or equivalent garment. While not thereto restricted, a typically satisfactory embodiment of such a device is represented by an ITEM 7000 or the like (depending on particular size wanted) "Round Eye Swivel Snap Hook" procurable from LEIGH SALES & PRODUCTS, INC. of Allentown, Pennsylvania 18105. |
| 86 | The frame or body unit of snap hook 85 (shown only in FIG. 15). |
| 87 | Again, illustrated only in FIG. 15, the hook-opening pull-back knob or projection of the snap hook (with the internal spring-loading features for automatic return to closed position of the hook when not pulled open not brought forth in the identified view of the Drawing). |
| 88 | Again, illustrated only in FIG. 15, the slide-back or closing bar or element of the snap hook which is withdrawn by movement of knob 87. |
| 90 | Likewise shown only in FIG. 15, the General identification of a swivel connection arrangement to the end-connecting "eye" or attachment opening of the snap hook (although, despite their attractiveness for obvious reasons of enhanced flexibility, swivelling connecting hooks are not necessarily employed). |
| 92 | Further with showing thereof only in FIG. 15, the "eye" or clasp-opening connecting end of the snap hook through which the safety strap is threaded for any desired manner of securement therein, including by advantageous utilization of adjustable buckle safety strap lengthening or shortening accommodations. |

With an overview of the several depictions, views and illustrations of the Drawing being maintained (especially in light of the foregoing explanatory parts, etc., elucidations), the subsequent portion of this Specification now turns to a somewhat more cohesive and particularized disclosure and exposure of and coordinated amplification upon the invention; including therein most appropriate and expedient (or best) manners and means stemming from the foregoing in which the same may be advantageously and propitiously embodied and practiced.

In this connection, the basic principles and limitations of: motorcycles; motorcycle seats; solenoid-powered and like or equivalent actuators; electrically-operated door and other article or item locking and/or clamping mechanisms; pressure and otherwise actuated and like or equivalent electric switch or circuit opening and closing devices; power supplies; fastening means; straps and belting and banding; clamping and hooking devices and contrivances for strap(s), rope and the like; and buckling and clasping (adjustable or otherwise) contraptions and implementations for strapping, belting, cordage and rope and so forth are so widely comprehended by those skilled in the art that greatly detailed elaboration of all the basics thereof is not herein made or attempted; the same being unnecessary for thorough understanding and recognition of the advance possibilitated for achievement and realization by and with the development in and of a motorcycle safety-release back rest and the like improvement that is according to and in keeping with the present invention.

PARTICULARIZED OPERATION AND USE DESCRIPTION OF THE INVENTION

As is clearly evident and readily-enough apparent in and not-difficultly deducible from the foregoing disclosure and description, the present invention in basic essence and substance contemplates a vest or other like or equivalent jacket or coat-type of vestment or garment that is wearable by the driver of a motorcycle (or like or equivalent vehicle as above contemplated and indicated) which, when assumed and worn by the driver, is optionally attached or "hooked-up" via safety strap or belt connections first made at the vest to be then "anchored" or locked to a forwardly-disposed holding or locking releasable component or unit to which the opposite end of the safety strap is secured when the assembly combination is fully connected and in operable function.

The locking elements or "anchors" at the point of safety strap securement to the releasing component or unit are so fixed that they unlock and release quickly and easily for complete disengagement when the cyclist, purposely or involuntarily, moves off or is lifted or thrown upwardly from the seat, (or like or equivalent driver support means in other than motorcycle vehicles). This automatic disengagement, especially in cases of unexpect disruptions and/or accidents, frees the cyclist (or driver or rider of other vehicle or like or equivalent locomoted transport equipment) from unescapable fixed and dangerously bound conection and association with an onward moving vehicle; thus tending to greatly minimize if not entirely escape more serious physical injury or even lethal trauma than if freedom from the vehicle attachment could not be so readily provided and obtained.

At the same time, when the safety-release back rest appliance or apparatus combination of the invention is will-fully utilized and put in effectively-functioning operability for its intended usage and purposes, the cyclist or (other vehicle driver) can quite comfortably and securely lean back during the ride in restful, more comfortable and safer (i.e., much less "nerve-wracking", strenous and/or tedious) posture position in the course of vehicle running and movement. This backrest support, as has been mentioned, is ordinarily materially beneficial to vastly enhanced and much more relaxed ride enjoyment and comfort during the involved transportation. It greatly aids, as has been noted, in coping with the sheer wind velocity factor and influence in normal motorcycle and the like driving and riding.

Excepting when involuntarily caused and motivated by unintentional and/or unwanted accident or rough-road travel, the driver can readily release himself from attachment to the vehicle by simply getting-off the seat. Or, as has been explained, he can purposely disengage and not utilize or take advantage of the unit by turning "off" of the optional hook up switch during travel. Any or all of this releases the safety strap from the locked engagement to the motorcycle or other vehicle. Also, especially when readily detachable couplings to the vest are employed (such as the illustrated snap hooks and the like catches or fastening clasps, the rider is also free to easily and completely disengage the strap from the vest, leaving him entirely unencumbered with unnecessary equippage and appendages.

Along this line and as been explained, it is generally more advantageous and desirable for the releasing-unit-actuating-seat switch to govern the unlocking of the strap when full rider weight is taken off the seat. However, as has also been mentioned, it is sometimes of preference or pre-determined choice to have such releasing motivation implemented when less than full driver weight is relieved from or taken off the seat. The seat switch can be readily designed and arranged to be so operative.

The mentioned 50–100 lb. or so weight-removal of or from (and upon) seat pressure in order to activate the seat switch is in the typical range when less than full rider weight removal provisions are wanted to work the seat switch. Naturally, other loading values to work the seat switch can also be adapted. Such reduced load actuating arrangements are frequently considered to be of advantage in order, especially in cases of accident, to not have the rider-uplifting action so violent or forceful as to cause him or her to be completely thrown off the seat in overcoming of involved full weight before effectuation of the desired safety-release action and mechanism.

In another possible and sometimes desired emodiment variation in practice of the invention, the releasing component or unit can be readily positioned as a unit assembly interconnected at the end or close thereto of the vest side of the safety strap or, for that matter, intermediate the length of the strap. While not previously discussed (and not shown or in any way depicted in the Drawing), this leaves the possibility of having the safety strap securely and dismountably fixed to the handlebar, neck or other portion of the vehicle (although it can also be thereat disengageable in such arrangements).

With such manner of arrangement, the releasing unit can then be easily and analogously disengaged from the vest when purposeful dismount or accidental throwoff from the seat is done or encountered by the rider.

In fact, as a further sophistication of such variation, a vest-side oriented or intermediate-of-safety strap disposition of the releasing unit can be equipped with an extra single or double set of quick-opening coupling connections (above and beyond the automatic unlocking disengagement mechanism) for achievement of entire flexibility in handling and use of a so-arranged releasing component.

Yet another refinement that can be included in incorporations of the present invention which, despite its lack of illustration in the Drawing is obviously and easily visualizable by and comprehensible from mere description thereof, is to have or make the safety strap(s) so arranged and storable when not extending in self-withdrawing, automatic recoil containers or structures, much in the manner of automatically retractable "measuring tape" and "wire- and/or -cable" dispensing and retracting devices. The generally spring-actuated recoil systems for the safety strap(s) can be of the entirely automatic variety which self-withdraw when no or insufficiently extending force or pull is thereon applied or in the style of those that require actuation of a button or other generally manually operated retracting-motion-starting means to effectuate the recoil mechanism. Such compementary arrangements avoid the bother and possible nuisance (or even danger) of having an uncoiled or unwrapped strap left free to dangle or fall about or upon the vehicle mechanism and/or the body of the rider involved when the strap is disengaged from full operative connection.

Somewhat along this line insofar as concerns neatness and compactness of embodiments of the invention, the releasable unit or component, no matter where positioned, is desirably as small and compact as possible. When handlebar mounted on a motorcycle, care should be taken that its placement does not hide or obscure the instrument panel.

A still further refinement of great advantage for complementary association with and additional inclusion in the safety-release back rest apparatus and combinations of the present invention (also not portrayed in the Drawing but fully understandable and visualizable from mere description thereof) is the incorporation of a "tether switch" or "kill button", as it were, supplement to and in the combination. These can well be the well known varieties and constructions commonly utilized in "snowmobiles" and like vehicles, and/or likes and equivalents thereof. A "tether switch" usually must be "on" in order for the vehicle to run or be capable of any operation. Its actuation (somewhat analogous to the setting off by the release or readying-for-explosion pin lifting or setting in a grenade or the like) requires very little force for the purpose. It is usually employed so as to be "on" when the driver has grasp of at least one of the handlebars or other steering means of the vehicle; but chain, cord or otherwise link-connected to the hand, wrist, elbow, belt loop or other vestment part of the driver, foot or wherever.

In this way, any excessive (and literally not very much at that) movement or displacement of the body part to which "tether switch" connection is made with the driver—indicating or caused by his disengaging manipulation for any reason with the operational devices necessary for good and orderly running of the vehicle—shuts everything off and immobilizes vehicular locomotion and running possibities (including stopping or instantaneous "killing" of motors and the like drive power sources).

The excellent and very practical and beneficial results achieved in practice of the present invention are obtained by the very propitions and functionally excellently adapted interrelationship and calculated, pre-conceived correlation of the seat switch actuating potential as regards its operation of the releasing component or unit and the latter's affecting of the back-rest vest (or the like) securement in holding place and position about the driver when his or her weight is on the seat; while at the same time entirely and with quick facility capable of disengaging and uncoupling all that when not enough driver weight is on the seat to push or urge the seat switch into safety strap locking and escape prevention release of the strap interconnection and engagement with the releasing unit.

While embodiments of the invention are well adapted to be installed on already-made motorcycles and the like or equivalent vehicles, it is plain and needless to mention that the presently-contemplated safety-release back rest arrangements are readily capable of being designed into and made integral appurtenant parts of newly-made, production-line or otherwise assembled new vehicles.

Many changes and modifications can readily be made in and adapted to embodiments and practices in accordance with the present invention without substantial departation from its apparent and intended spirit and scope, all in pursuance and accordance with the same as it is set forth and delineated in the hereto-appended claims.

What is claimed is:

1. A safety-release back rest rig assembly for a motorcycle having forward or stem and rearward or stern terminations and like or equivalent vehicle(s) comprising, in cooperative inter-related associated and combination:

(a) a basic vehicle body structure;

(b) means on said vehicle body strucure (a) for seating a driver of said vehicle in appropriately mounted driving disposition on and for said vehicle;

(c) vest-like and equivalent garment apparel means for wearing by said driver of (b), said vest-like means being adapted to well receive and encasingly hold said driver;

(d) at least a single safety strap means attachable and securable at or about its rearwardly-extending end in sling-like, forwardly-disposable fashion to the frontal part of said vest-like garment means (c) for wearing by said driver;

(e) a safety strap(s) means holding and releasing component unit secured fixedly on said body structure of the motorcycle forward of said seating means (b) for said driver, which component upon and by electrical energization is adapted to (f) receive, anchor and lockingly-engage the forwardly-disposable portion at or near its forward end of each of said therein plugged-in safety strap(s) means (d) when said component (e) is in a "locking" and safety strap-retaining position; and (g) release and freely disconnect, disanchor and disengage said forwardly-disposable end of each of said safety strap(s) means (d) when said component (e) is in an "open" and safety strap-releasing position;

(h) an electrical switch and circuitry switching unit associated with said seating means (b) responsive for "on" and "off" setting purposes to applied driver weight when one is sitting thereupon and electrically connected with said component unit (e) which is adapted to pass adequate electrical energy by means of interconnecting electrical circuitry;

(i) to cause said component unit in said cooperative rig combination assembly to firmly and strongly anchor, engage and lock to close and secure any portion of said forwardly-disposable end(s) of any and all of said safety strap(s) means (d) therein plugged when at least a predetermined portion, if not all, of the total supported weight of said driver in (b) and (c) is mounted and disposed and resting upon said seating means (b); and, conversely (j) to cause said component unit (e) to quickly, freely and easily disanchor, disengage and open to free and unsecured liberated disposition any portion of said forwardly-disposable end(s) of any and all of said safety strap(s) means (d) therein plugged when more than said predetermined portion, if not all, of the total supported weight of said driver in (b) and (c) is dismounted and neither disposed nor resting upon said seating means (b).

2. A motorcycle and equivalent vehicle safety-release back rest rig assembly combination in accordance with the combination of claim 1, wherein (k) said seating means (b) for driver mounting is in the nature of a typical motorcycle seat and the like.

3. A motorcycle and equivalent vehicle safety-release back rest rig assembly combination in accordance with the combination of claim 1, wherein said vest-like apparel means (c) has, in further cooperative and associated combination therewith:

(l) a thereto-attached reinforcing support cincture element affixed integrally on its backside in generally lateral disposition thereabout.

4. A motorcycle and equivalent vehicle safety-release back rest rig assembly combination in accordance with the combination of claim 1, wherein said vest-like apparel means (c) has, in further cooperative and associated combination therewith:

(m) an attached pair of freely-depending belt length sections, having each respectively adapted to intermediately dangle from about each side of and each having its unaffixed end free of said vest-like apparel means (c);

said belt sections (m) being adapted to be securely connected with said rearwardly-extending safety strap(s) means (d) at about the rearward extremity of the latter.

5. A motorcycle and equivalent vehicle safety-to-release back rest rig assembly combination in accordance with the combination of claim 1, wherein said vest-like apparel means 8(c) has in further cooperative and associated combination therewith:

(l) a thereto-attached reinforcing support cincture element affixed integrally on its backside in generally lateral dispositon thereabout;

(m) an attached pair of freely-depending belt length sections each of which respectively extends from and is integrally connected with respective ends of said cincture support element (l) and each of which is respectively adapted to intermediately dangle from about each side of and having its unaffixed end free of said vest-like apparel means (c); with (n) a holding ring or equivalent member at about the freely depending end of each of said belt length sections (m) which ring members are adapted to be engaged in secure connection with said rearwardly-extending safety strap(s) means (d) at about the rearward extremity of the latter.

6. A safety-release back rest rig assembly combination that is pursuant to claim 1, wherein there is only a single safety strap means (d) therein included.

7. A safety-release back rest rig assembly combination that is pursuant to claim 2, wherein there is only a single safety strap means (d) therein included.

8. A safety-release back rest rig assembly combination that is pursuant to claim 4, wherein there is only a single safety strap means (d) therein included.

9. A safety-release back rest rig assembly combination that is pursuant to claim 5, wherein there is only a single safety strap means (d) therein included.

10. A safety-release back rest rig assembly combination that is pursuant to any one of the combinations of claims 4, 6, 7, 8 or 9, inclusive, wherein said safety strap(s) means (d) is of leather.

11. A safety-release back rest rig assembly combination that is pursuant to claim 10, wherein each of said safety strap(s) means (d) has in further cooperative and associated combination therewith:

(o) a recoil unit means therewith for winding up and storing said safety strap(s) means (d) when not in lengthwise extended disposition.

12. A safety-release back rest rig assembly combination that is pursuant to claim 11, wherein each of said safety strap(s) means (d) has in further cooperative and associated combination therewith:

(r) an adjustable buckle unit means therewith and therein provided for changing the length of said strap means to most propitiously and comfortably accomodate the posture and positioning of said driver of (b) and (c) when mounted on said seating means (b).

13. A safety-release back rest rig assembly combination that is pursuant to claim 10, wherein each of said safety strap(s) means (d) has in further cooperative and associated combination therewith:

(q) an engagable holding means at its forward end for reception by and locking into said safety strap(s) means holding and releasing component (e) when the latter is in its said closed strap-locking and anchoring causation disposition (i).

14. The engagable holding means (q) in the combination of claim 13 whern it is in the form of a centrally open, ring-like catch holder.

15. A safety-release back rest rig assembly combination that is pursuant to claim 13, wherein each of said safety strap(s) means (d) has in further cooperative and associated combination therewith:

(r) an adjustable buckle unit means therewith and therein provided for changing the length of said strap means to most propitiously and comfortably accomodate the posture and positioning of said driver of (b) and (c) when mounted on said seating means (b).

16. A safety-release back rest rig assembly combination that is pursuant to claim 14, wherein each of said safety strap(s) means (d) has in further cooperative and associated combination therewith:

(r) an adjustable buckle unit means therewith and therein provided for changing the length of said strap means to most propitiously and comfortably accomodate the posture and positioning of said driver of (b) and (c) when mounted on said seating means (b).

17. A safety-release back rest rig assembly combination that is pursuant to any one of the combinations of claims 1, 2, 4, 6, 7, 8 or 9, inclusive, wherein each of said safety strap(s) means (d) has in further cooperative and associated combination therewith:

(o) a recoil unit means therewith for winding up and storing said safety strap(s) means (d) when not in lengthwise extended disposition.

18. A safety-release back rest rig assembly combination that is pursuant to claim 17, wherein each of said safety strap(s) means (d) has in further cooperative and associated combination therewith:

(p) a quick-opening, snap-clasp type of fastener at its rearwardly-extending end for attaching and securing same to the frontal part of said vest-like garment means (c).

19. A safety-release back rest rig assembly combination that is pursuant to claim 18, wherein each of said safety strap(s) means (d) has in further cooperative and associated combination therewith:

(r) an adjustable buckle unit means therewith and therein provided for changing the length of said strap means to most propitiously and comfortably accommodate the posture and positioning of said driver of (b) and (c) when mounted on said seating means (b).

20. A safety-release back rest rig assembly combination that is pursuant to claim 17, wherein each of said safety strap(s) means (d) has in further cooperative and associated combination therewith:

(q) an engageable holding means at its forward end for reception by and locking into said safety strap(s) means holding and releasing component (e) when the latter is in its said closed strap-locking and anchoring causation disposition (i).

21. The engagable holding means (q) in the combination of claim 20 when it is in the form of a centrally open, ring-like catch holder.

22. A safety-release back rest rig assembly combination that is pursuant to claim 20, wherein each of said safety strap(s) means (d) has in further cooperative and associated combination therewith:

(r) an adjustable buckle unit means therewith and therein provided for changing the length of said strap means to most propitiously and comfortably accomodate the posture and positioning of said driver of (b) and (c) when mounted on said seating means (b).

23. A safety-release back rest rig assembly combination that is pursuant to claim 21, wherein each of said safety strap(s) means (d) has in further cooperative and associated combination therewith:

(r) an adjustable buckle unit means therewith and therein provided for changing the length of said strap means to most propitiously and comfortably accomodate the posture and positioning of said driver of (b) and (c) when mounted on said seating means (b).

24. A safety-release back rest rig assembly combination that is pursuant to any one of the combinations of claims 1, 2, 4, 6, 8 or 9 inclusive, wherein each of said safety strap(s) means (d) has in further cooperative and associated combination therewith:

(p) a quick-opening, snap-clasp type of fastener at its rearwardly-extending end for attaching and securing same to the frontal part of said vest-like garment means (c).

25. A safety-release back rest rig assembly combination that is pursuant to claim 24, wherein each of said safety strap(s) means (d) has in further cooperative and associated combination therewith:

(p) a quick-opening, snap-clasp type of fastener at its rearwardly-extending end for attaching and securing same to the frontal part of said vest-like garment means (c).

26. A safety-release back rest rig assembly combination that is pursuant to claim 25, wherein each of said safety strap(s) means (d) has in further cooperative and associated combination therewith:

(r) an adjustable buckle unit means therewith and therein provided for changing the length of said strap means to most propitiously and comfortably accomodate the posture and positioning of said driver of (b) and (c) when mounted on said seating means (b).

27. A safety-release back rest rig assembly combination that is pursuant to claim 24, wherein each of said safety strap(s) means (d) has in further cooperative and associated combination therewith:

(q) an engagable holding means at its forward end for reception by and locking into said safety strap(s) means holding and releasing component (e) when the latter is in its said closed strap-locking and anchoring causation disposition (i).

28. The engagable holding means (q) in the combination of claim 27 when it is in the form of a centrally open, ring-like catch holder.

29. A safety-release back rest rig assembly combination that is pursuant to claim 27, wherein each of said safety strap(s) means (d) has in further cooperative and associated combination therewith:

(r) an adjustable buckle unit means therewith and therein provided for changing the length of said strap means to most propitiously and comfortably accomodate the posture and positioning of said driver of (b) and (c) when mounted on said seating means (b).

30. A safety-release back rest rig assembly combination that is pursuant to claim 28, wherein each of said safety strap(s) means (d) has in further cooperative and associated combination therewith:

(r) an adjustable buckle unit means therewith and therein provided for changing the length of said strap means to most propitiously and comfortably accomodate the posture and positioning of said driver of (b) and (c) when mounted on said seating means (b).

31. A safety-release back rest rig assembly combination that is pursuant to any one of the combinations of claims 1, 2, 4, 6, 7, 8, or 9, inclusive, wherein each of said safety strap(s) means (d) has in further cooperative and associated combination therewith:

(q) an engagable holding means at its forward end for reception by and locking into said safety strap(s) means holding and releasing component (e) when the latter is in its closed strap-locking and anchoring causation disposition (i).

32. The engagable holding means (q) in the combination of claim 31 when it is in the form of a centrally open, ring-like catch holder.

33. A safety-release back rest rig assembly combination that is pursuant to claim 32, wherein each of said safety strap(s) means (d) has in further cooperative and associated combination therewith:

(r) an adjustable buckle unit means therewith and therein provided for changing the length of said strap means to most propitiously and comfortably accomodate the posture and positioning of said driver of (b) and (c) when mounted on said seating means (b).

34. A safety-release back rest rig assembly combination that is pursuant to any one of the combinations of claims 1, 2, 4, 6, 7, 8, or 9, inclusive, wherein each of said safety strap(s) means (d) has in further cooperative and associated combination therewith:

(r) an adjustable buckle unit means therewith and therein provided for changing the length of said strap means to most propitiously and comfortably accomodate the posture and positioning of said driver of (b) and (c) when mounted on said seating means (b).

35. The adjustable buckle means (r) in the combination of claim 12 when it is of the quick-opening and -releasing variety and design.

36. A motorcycle and equivalent vehicle safety-release back rest rig assembly combination in accordance with the combination of claim 1, wherein (r) said seating means (b) for driver mounting is in the nature of a typical motorcycle seat and the like which has in further cooperative and associated combination therewith:

(s) an encircling band intermediately thereabout securely fastened at one of its ends to said seat and connected at its other free end to the "on" and "off" actuating control for said electrical switch unit (h) whereby the influence of substantially full driver weight resting on said seating means (k) tends to so pull and urge said band (s) as to set said switch unit (h) into appropriate position to actuate and activate said safety strap(s) means holding and releasing component (e) to said closed strap-locking and anchoring causation (i) posture of the component (e); and uplifting and removal of at least a portion of the driver weight from resting on said seating means (k) tends to relieve urging pulling of said band (s) back to its normal untensed encirclement of said seating means so as to alternately set said switch unit (h) into appropriate position to deactuate and deactivate said safety strap(s) means holding and releasing component (e) to said open strap-liberating and -disengaging causation (j) posture of the component (e).

37. The combination of claim 36, wherein said seat encircling band (s) is comprised of an essentially non-elastic material of construction.

38. The combination of claim 36, wherein said seat encircling band (s) is leather.

39. A combination pursuant to claims 37 or 38 wherein there is additionally included in cooperative assembly therein a spring means interconnecting the said free end of said seat encircling band (s) with said actuating control for said electrical switch unit (h).

40. A motorcycle and equivalent vehicle safety-release back rest rig assembly combination in accordance with the combination of claim 1, wherein (t) said safety strap(s) means holding and releasing component (e) contains an electrically energizable solenoid unit therein for actuation and deactuation of the component (e) to one or another of said respective positions wherein the component (e) is either its closed, strap-locking and anchoring causation (i) posture or in its open, strap-liberating and disengaging causation (j) posture.

41. A motorcycle and equivalent vehicle safety-release back rest rig assembly combination in accordance with the combination of claim 1, wherein (t) said safety strap(s) means holding and releasing component (e) contains an electrically energizable solenoid unit therein for actuation and deactuation of the component (e) to one or another of said respective positions wherein the component (e) is in either its closed, strap-locking and anchoring causation (i) posture or in its open, strap-liberating and -disengaging causation (j) posture; and (u) said solenoid unit (t) of said holding and releasing component (e) is adapted to move a hold pin back and forth in order to:

engage and catch for retention the forward end(s) of any and all of said safety strap(s) means when said component (e) is in its closed, strap-locking and anchoring causation (i) posture; and disengage and freely release for liberation the forward end(s) of any and all of of said safety strap(s) means when said component (e) is in its open, strap-liberating and -disengaging causation (j) posture.

42. Either one of the combinations pursuant to those of claims 18 or 19 when mounted on and with the handlebar of a motorcycle and like-type vehicle.

43. Either one of the combinations pursuant to those of claims 18 or 19 when mounted with the handlebar neck of a motorcycle and like-type vehicle.

44. Either one of the combinations pursuant to those of claims 18 or 19 having in further cooperative and associated combination therewith:

(v) an auxilliary "on-off" reversing switch included in the electrical circuitry of said holding and releasing component (e) which switch is adapted when in its "off" position to render said component (e) inoperable and maintained in its open, strap-liberating and -disengaging causation (j) posture.

45. A motorcycle and equivalent vehicle safety-release back rest rig assembly combination in accordance with the combination of claim 1, wherein said vehicle is of the motor-powered and driven variety and has in further cooperative and associated combination therewith:

(w) a "tether switch" installation arrangement on said vehicle body structure (a) and adapted to be connected to some part of the driver in (b) and (c), which "tether switch" (s) is adapted to shut down and "kill" the locomoting motor power drive means of the vehicle when said "tether switch" (w) is put in its "off" position by disengaging manipulation by and of said driver for any reason of such driver movement.

46. A motorcycle having thereon and being provided with the safety-release back rest rig assembly combination of claim 1.

47. A bicycle having thereon and being provided with the safety-release back rest rig assembly combination of claim 1.

48. A motor drive-assisted bicycle having thereon and being provided with the safety-release back rest rig assembly combination of claim 1.

49. A snowmobile having thereon and being provided with the safety-release back rest rig assembly combination of claim 1.

50. A boat having thereon and being provided with the safety-release back rest rig assembly combination of claim 1.

51. An adjustable buckle means (r) in a combination that is pursuant to any one of the combinations of claims 33–30, inclusive, when it is of the quick-opening and -releasing variety and design.

*52. A releasable back support assembly for use by a rider seated on a cycle frame having wheel means at its forward and rearward ends and a seat for such rider between said wheel means, said assembly comprising a sling-like member for embracing the rider's back; movable anchor means carried by said frame forwardly of said seat; strap means separably secured at one end to said anchor means and at its opposite end to said member, said strap means being of such length as to be taut and provide support for the rider's back when the rider leans rearwardly against said member;*

*electrical operating means coupled to said anchor means and operable to move the latter from a first position in which it secures said one end of said strap means to said frame to a second position in which said one end of said strap means is disengageable from said anchor means; and electrical actuating means coupled to said operating means for operating the latter said actuating means including means movable between closed and open positions in response to seating and unseating of the rider on and from said seat.*

*53. A back support assembly according to claim 52 wherein said sling-like member comprises a garment which may be worn by said rider.*

*54. A back support assembly according to claim 53 wherein said garment is a vest.*

*55. A back support assembly according to claim 53 wherein said garment is a jacket.*

*56. A back support assembly according to claim 52 wherein said strap means is adjustable in length, and including means for maintaining said strap means at a selected length.*

*57. A back support assembly according to claim 52 wherein said anchor means comprises a projection protruding from said frame.*

*58. A back support assembly according to claim 57 wherein said projection comprises a pin.*

*59. A back support assembly according to claim 57 wherein said strap means includes a loop for the removable accommodation of said projection.*

*60. A back support according to claim 52 wherein said sling-like member comprises a belt.*

*61. A back support according to claim 60 wherein said belt is secured to a vest that may be worn by said rider.*

*62. A back support according to claim 60 wherein said belt includes rings at its opposite ends removably secured to strap means.*

* * * * *